United States Patent
Cui et al.

[11] Patent Number: 5,977,738
[45] Date of Patent: Nov. 2, 1999

[54] METHOD AND SYSTEM FOR CONTOLLING THE POSITION OF A SERVO MOTOR IN VEHICLE SPEED CONTROL SYSTEMS FOR VARIOUS OPERATION CONDITIONS

[75] Inventors: Xainzhong John Cui, Canton, Mich.; Matti K. Vint, Bridgeman Down, Australia

[73] Assignee: Ford Motor Company, Dearborn, Mich.

[21] Appl. No.: 09/032,810
[22] Filed: Mar. 2, 1998
[51] Int. Cl.[6] ................................................. G05D 23/275
[52] U.S. Cl. .................... 318/632; 318/560; 318/568.22; 318/568.23; 318/569
[58] Field of Search .................................. 318/632, 560, 318/568.22, 568.23, 569

[56] References Cited

U.S. PATENT DOCUMENTS 5,615,116  3/1997  Gudat et al. ............................ 318/560
5,684,696  11/1997  Rao et al. ............................ 318/569 X

*Primary Examiner*—Karen Masih
*Attorney, Agent, or Firm*—Allan J. Lippa; Roger L. May

[57] ABSTRACT

A method and system for accurately controlling a position of a servo motor in a vehicle speed control system for various operation conditions includes predetermined parameters of a polynomial which define desired positions of a servo motor for various vehicle speeds under normal operation conditions. A sensor senses a speed of the vehicle and generates a corresponding speed signal. A controller determines an initial desired position of servo motor based on the speed signal. The controller also determines whether the operation condition of the vehicle has deviated from the normal operation condition, and if so, determines a revised desired position of the servo motor based on the actual position of the servo motor and the initial desired position of the servo motor. Finally, the controller controls the servo motor based on the revised desired position of the servo motor.

18 Claims, 3 Drawing Sheets

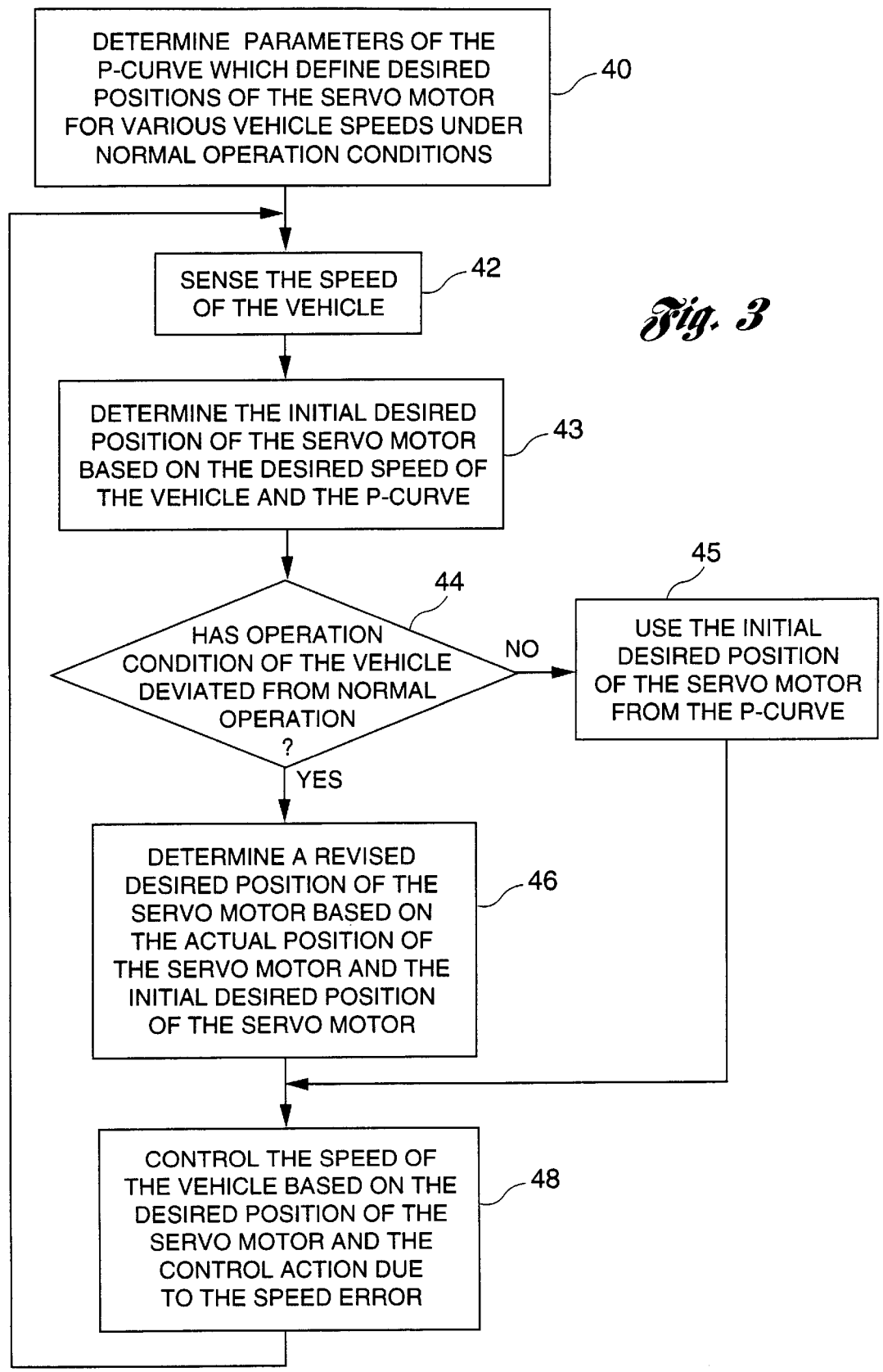

METHOD AND SYSTEM FOR CONTOLLING THE POSITION OF A SERVO MOTOR IN VEHICLE SPEED CONTROL SYSTEMS FOR VARIOUS OPERATION CONDITIONS

TECHNICAL FIELD

This invention relates to methods and systems for controlling the position of a servo motor in vehicle speed control systems for various operation conditions.

BACKGROUND ART

A vehicle speed control system adjusts the position of an engine throttle plate in order to maintain a driver selected speed (the SET speed). At the moment that the driver starts automatic speed control, the control system reopens the throttle and takes over the vehicle operation.

The control action typically consists of two components: 1) the desired initial servo motor position; and 2) the control algorithm for providing adjustments according to speed errors. For the first component, the required servo motor position is derived from the SET speed through a linear approximation. In order to find a good approximation for different speed ranges for various vehicle models, this linear approximation is calibrated with many tradeoff considerations between high speed and low speed, many hours of test driving, and calibration experience for fine tuning. Additionally, the control algorithm in the second component contents with the nonlinear response of the engine dynamics and the vehicle dynamics, which leads to a complicated control system design and calibration process.

Thus, there exists a need for accurately determining the desired initial servo motor position considering the nonlinear properties of the vehicle, and for modifying this initial servo motor position in real time to accommodate various operation conditions.

DISCLOSURE OF THE INVENTION

It is thus a general object of the present invention to provide a method and system to determine an accurate initial desired motor position and to modify it in real time in order to accurately control a vehicle speed for various operation conditions.

In carrying out the above object and other objects, features, and advantages of the present invention, a method is provided for accurately controlling a speed of a vehicle according to various operation conditions. The method includes the step of determining parameters of a polynomial which define desired positions of a servo motor for various vehicle speeds under normal operation conditions. The method also includes the step of sensing a speed of the vehicle and generating a corresponding speed signal. Still further, the method includes the steps of determining an initial desired position of the servo motor based on the speed signal, determining whether the operation condition of the vehicle has deviated from the normal operation condition and, if so, determining a revised desired position of the servo motor based on the actual position of the servo motor and the initial desired position of the servo motor. Finally, the method includes the step of controlling the servo motor based on the revised desired position of the servo motor.

In further carrying out the above object and other objects, features, and advantages of the present invention, a system is also provided for carrying out the steps of the above described method. The system includes a sensor for sensing a speed of the vehicle and generating a corresponding speed signal. The system also includes a controller for storing the parameters of the polynomial and determining the initial desired position of the servo motor based on the speed signal. The controller is further operative to determine whether the operation condition of the vehicle has deviated from the normal operation condition and, if so, to determine a revised desired position of the servo motor based on the speed signal and the initial desired position of the servo motor. Still further, the controller is operative to control the servo motor based on the revised desired position of the servo motor.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 3 is a flow diagram illustrating the general sequence of steps associated with the present invention.

BEST MODES FOR CARRYING OUT THE INVENTION

Figure 1:
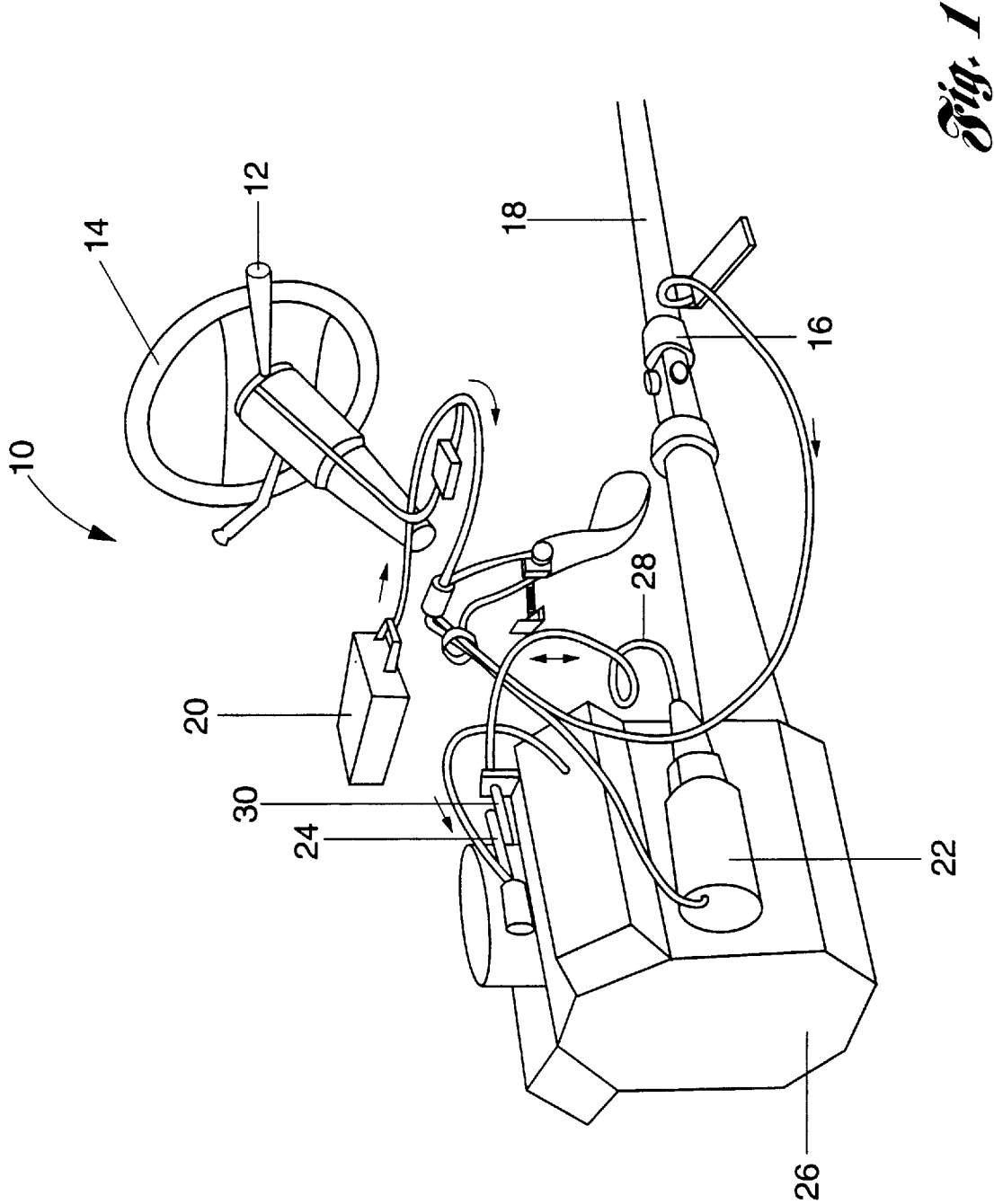
FIG. 1 is a schematic diagram of a speed control system for an automotive vehicle.

Turning now to FIG. 1, there is shown a schematic diagram of a speed control system, denoted generally by reference numeral 10, according to the present invention for controlling the speed of an automotive vehicle. The system 10 includes a speed control switch array 12 for activating and controlling the speed control operations. The speed control switch array 12 may be incorporated onto a turn indicator lever, as shown in FIG. 1, on the steering wheel 14, or on the instrument panel (not shown). The speed control switch array 12 includes a switch for turning speed control ON/OFF, and other switches for setting the desired speed, accelerating and decelerating the speed of the vehicle while remaining in speed control operation, canceling the speed control operation, and resuming the speed control operation by attaining the prior vehicle SET speed before being canceled by the driver/operator.

A vehicle speed sensor 16 is preferably secured to a drive shaft 18 of the vehicle. In this case, the speed sensor 16 consists of magnets and a pickup coil. The magnets typically have four poles positioned 90 degrees apart on the vehicle's drive shaft 18. As the magnets turn with the shaft 18, they pass across the face of the pickup coil, permitting the pickup coil to sense the speed at which the drive shaft 18 is revolving. Alternatively, the speed sensor may comprise wheel speed sensors coupled to the wheels (not shown) of the vehicle.

The speed signal from the speed sensor 16 is sent to a speed controller 20 which compares the speed of the drive shaft 16 (which is directly related to the speed of the vehicle) with the desired speed programmed into the speed controller 20 by the driver via the switch array 12. The speed controller 20 can be embodied by an electronically programmable microprocessor, a microcontroller, an application-specific integrated circuit, or a like device to provide a predetermined control logic.

When the two speed signals are not the same, the speed controller 20 sends a signal to a servo motor 22 to alter the speed of the vehicle. The servo motor 22 activates a throttle valve 24 which allows an engine 26 to take in more or less fuel. The servo motor 22 is connected by a cable 28 to a throttle valve linkage 30 of the fuel injection system. The cable 28 moves the throttle valve 24 according to the movement initiated by the servo motor 22.

To effectively control the vehicle speed, the desired position of the servo motor 22 is determined in two parts: 1) the desired position is initially determined based on the desired vehicle speed; and 2) the desired position is regulated according to speed error.

Figure 2:
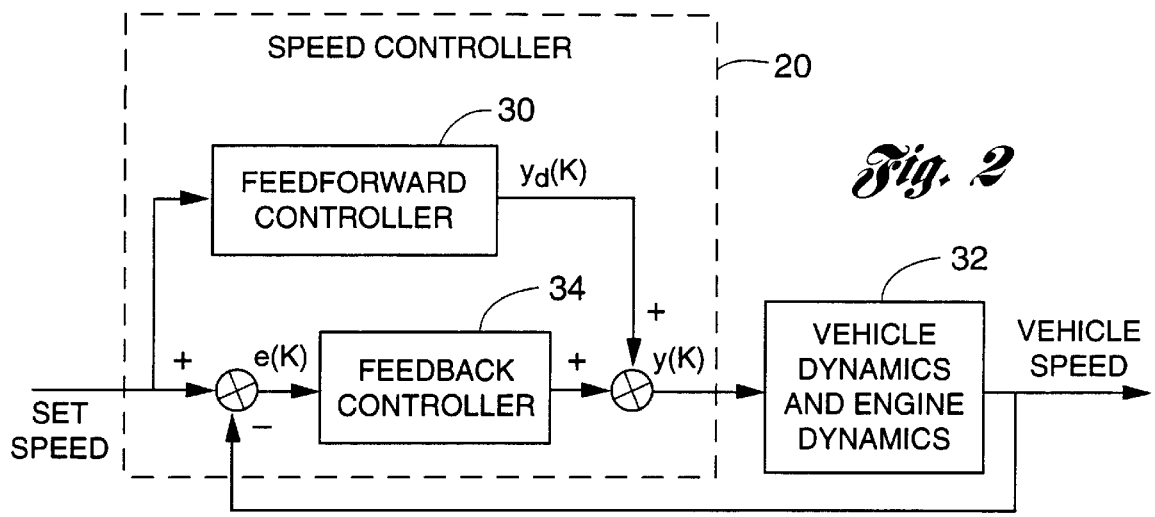
FIG. 2 is a block diagram illustrating the concept of the control method of the present invention utilized in a speed control system.

This concept is illustrated in the block diagram shown in FIG. 2. The initial desired position of the servo motor, $y_d(k)$, is determined according to a feedforward controller, block 30, as described in greater detail below.

Moreover, as shown in FIG. 2, the servo motor 22 is commanded accordingly by the speed controller 20 via control signal, $y(k)$. The actual vehicle speed, as sensed by speed sensor 16, is affected by the vehicle and engine dynamics, block 32, to provided a feedback signal. The vehicle speed feedback signal is compared to the SET speed to obtain a speed error signal, $e(k)$. The position of the servo motor 22 is then adjusted by a feedback control algorithm at block 34 in order to generate a new control signal according to the present vehicle speed error.

Turning now to FIG. 3, there is shown a flow diagram illustrating the general sequence of steps associated with the method of the present invention. The method consists of: 1) determining the desired motor position according to a given SET speed; and 2) modifying the desired motor position according to current vehicle operation conditions. In a preferred embodiment, the steps shown in FIG. 3 comprise a portion of a larger routine which performs other speed control functions.

The method begins with the step of determining parameters of a polynomial (referred to as a P-curve) which define an initial desired position of the servo motor 22 for various vehicle speeds under normal operation conditions, as shown at block 40. This is accomplished by driving the vehicle under speed control during normal operation conditions, e.g., on a test track with 0 percent grade with only one person in the vehicle and nothing being towed by the vehicle. At each speed, e.g., 20 mph to 80 mph with 10 mph increments, when the vehicle speed reaches a stable status, the position of the servo motor 22 and the corresponding vehicle speed is recorded.

Figure 4:
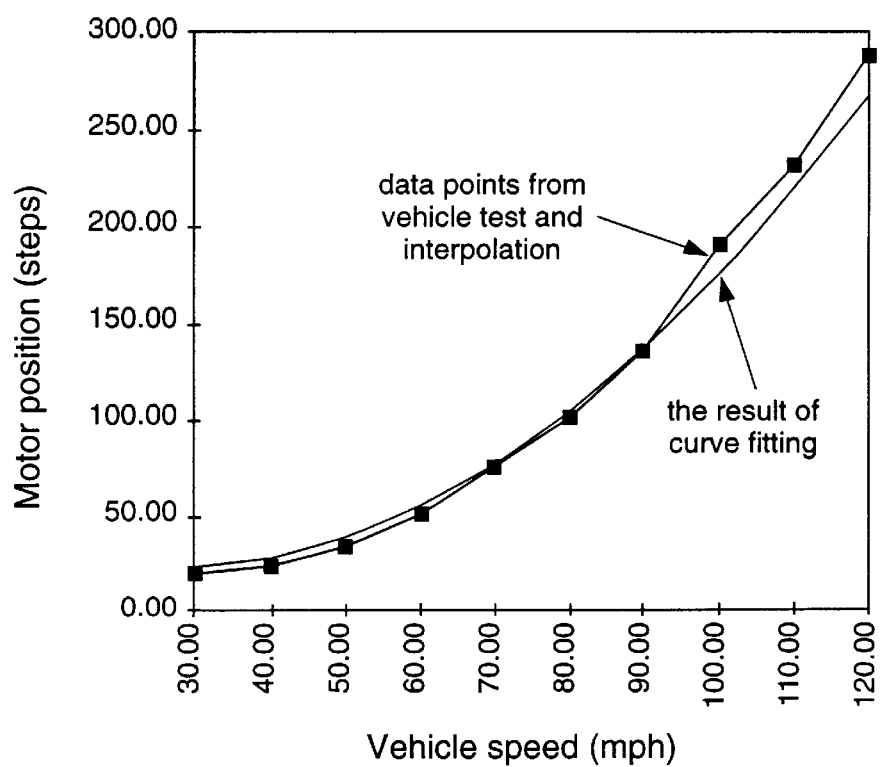
FIG. 4 is a graph illustrating a second order polynomial derived from vehicle testing data to represent the initial desired motor position according to the method presented in this invention.

Next, an interpolation, preferably a cubic spline interpolation, is applied to the data collected above to obtain a smooth curve of the motor positions corresponding to vehicle speed, as shown in FIG. 4. The curve is then fit utilizing polynomial curve fitting to derive the polynomial parameters of the motor position corresponding to the vehicle speed in a least-square sense. That is, the desired motor position is represented by the P-curve as:

$$y_d(k)=a_n v^n(k)+a_{n-1}v^{n-1}(k)+ \ldots +a_1 v(k)+C,$$

where $v(k)$ is the vehicle speed at time k.

The parameters of the P-curve are then programmed into and stored in the speed controller 20. The vehicle may then be tested again to make sure the curve is accurate and to do any adjustments that are necessary.

Returning to FIG. 3, during operation of the vehicle, the speed of the vehicle is continuously sensed, as shown at block 42. As shown at block 43, the initial desired position of the servo motor 22 is computed from the P-curve based on the desired vehicle speed, or SET speed. The speed of the vehicle is then utilized to obtain a correction factor of the initial desired motor position derived from the P-curve for use when and if the operation of the vehicle has deviated from normal vehicle operation. Suppose at time k the desired position of the servo motor 22 is given by:

$$Y_d(k)=a_n v_d^n(k)+a_{n-1}v_d^{n-1}(k)+ \ldots +a_1 v_d(k)+C,$$

with the parameters derived as before, and $v_d(k)$ is the desired vehicle speed at time k.

If the following conditions are true:

1) Speed error $e(k) < 2$ mph in steady speed control; and
2) The vehicle is not operated in an uphill condition;

then a correction factor, $C_m(k)$, is computed as $C_m(k)=y_a(k)-y_d(k)$, where $y_a(k)$ is the actual motor position at time k, corresponding to the commanded motor position, $y(k)$. Otherwise, $C_m(k)=C_m(k-1)$, and $C_m(0)=0$. Note that uphill conditions are determined by mainly checking the difference between the actual position of the servo motor 22 and the desired position of the servo motor 22 computed from the P-curve, and the speed error. The actual position of the servo motor 22 is determined according to the control action commanded by the speed controller 20. The correction factor is thus computed as the difference of the servo motor position caused by the desired servo motor position from the P-curve and that caused by the total control action of the speed controller 20.

Next, a determination is made as to whether the operation condition of the vehicle has deviated from normal operation condition, as shown at conditional block 44. This deviation is found if any of the following conditions are true:

1. Vehicle is accelerated by the speed control system; or
2. Uphill operation conditions are detected; and the following is true: The speed error $e(k) \geq 2$ mph continuously for 2 seconds under speed control.

If this deviation is not found, the initial position of the servo motor 22 derived from the P-curve is utilized, as shown at block 45. Otherwise, the desired position of the servo motor 22 is revised, as shown at block 46. The revised desired position of the servo motor 22 is determined according to:

$$y_{d1}(k+1)=y_d(k+1)+C_m(k).$$

That is, the correction factor, $C_m(k)$, is added to the initial desired position of the servo motor 22 computed from the P-curve. This added term operates to shift the P-curve up or down, without changing the general shape of the P-curve. Thus, a quick response to the change of vehicle operation conditions can be achieved.

Finally, the speed of the vehicle is controlled by speed controller 20 based on the revised desired position or the initial desired position of the servo motor 22 and the control action due to the speed error, as shown at block 48.

The present invention allows the speed control performance to be improved at the transition from a driver manual control to automatic speed control. Additionally, with more accurate estimation of the desired servo motor position, the concern of the nonlinear properties of the engine dynamics and the vehicle dynamics is reduced in the design of the feedback controller. Therefore, a simple control algorithm can be designed with a simplified controller calibration. Since all vehicle test data can be processed by computer programs to derive the parameters of the P-curve, the calibration process to compute the desired servo motor position using vehicle speed is greatly simplified. In addition, by modifying the P-curve according to the changes in driving conditions and road conditions, the present invention provides a quick response to these changes.

While the best modes for carrying out the invention have been described in detail, those familiar with the art to which this invention relates will recognize various alternative designs and embodiments for practicing the invention as defined by the following claims.

What is claimed is:

1. A method for controlling a position of a servo motor in a vehicle speed control system for various operation conditions, the method comprising:

determining parameters of a polynomial which define desired positions of the servo motor for various vehicle speeds under normal operation conditions;

sensing a speed of the vehicle and generating a corresponding speed signal;

determining an initial desired position of the servo motor based on the speed signal;

determining whether the operation condition of the vehicle has deviated from the normal operation condition;

if so, determining a revised desired position of the servo motor based on the actual position of the servo motor and the initial desired position of the servo motor; and controlling the servo motor based on the revised desired position of the servo motor.

2. The method as recited in claim 1 wherein determining the revised desired position of the servo motor includes determining a correction factor based on the actual position of the servo motor and the initial desired position of the servo motor.

3. The method as recited in claim 2 wherein determining the correction factor includes:

determining a speed error signal based on the speed signal; and determining whether the speed error signal is less than a predetermined threshold.

4. The method as recited in claim 3 wherein determining the speed error signal includes:

determining a desired vehicle speed; and determining a difference between the desired vehicle speed and the speed signal.

5. The method as recited in claim 3 wherein determining the correction factor includes:

determining the correction factor according to a previously determined correction factor if the speed error signal exceeds the predetermined threshold.

6. The method as recited in claim 2 wherein determining the revised desired position of the servo motor includes adding the correction factor to the initial desired position of the servo motor.

7. The method as recited in claim 3 wherein determining whether the operation condition of the vehicle has deviated from the normal operation condition includes determining one of the following conditions: the speed of the vehicle is accelerated by the servo motor, the vehicle is climbing uphill, and the speed error signal exceeds the predetermined threshold for a predetermined amount of time.

8. The method as recited in claim 1 wherein determining the parameters includes:

determining a stable vehicle speed at each of the predetermined speed intervals to obtain vehicle data;

applying an interpolation to the data to obtain a smooth curve; and fitting the curve by polynomial curve fitting.

9. The method as recited in claim 8 wherein applying the interpolation includes applying a cubic Spline interpolation.

10. A system for controlling a servo motor in a vehicle speed control system for various operation conditions including predetermined parameters of a polynomial which define desired positions of the servo motor for various vehicle speeds under normal operation conditions, the system comprising:

a sensor for sensing a speed of the vehicle and generating a corresponding speed signal; and a controller for determining an initial desired position of the servo motor based on the speed signal, determining whether the operation condition of the vehicle has deviated from the normal operation condition, and if so, determining a revised desired position of the servo motor based on the actual position of the servo motor and the initial desired position of the servo motor, and further for controlling the servo motor based on the revised desired position of the servo motor.

11. The system as recited in claim 10 wherein the controller, in determining the revised desired position of the servo motor, is further operative to determine a correction factor based on the actual position of the servo motor and the initial desired position of the servo motor.

12. The system as recited in claim 11 wherein the controller, in determining the correction factor, is further operative to determine a speed error signal based on the speed signal, and determine whether the speed error signal is less than a predetermined threshold.

13. The system as recited in claim 12 wherein the controller, in determining the speed error signal, is further operative to determine a desired vehicle speed, and determine a difference between the desired vehicle speed and the speed signal.

14. The system as recited in claim 12 wherein the controller, in determining the correction factor, is operative to determine the correction factor according to a previously determined correction factor if the speed error signal exceeds the predetermined threshold.

15. The system as recited in claim 11 wherein the controller, in determining the revised desired position of the servo motor, is further operative to add the correction factor to the initial desired position of the servo motor.

16. The system as recited in claim 12 wherein the controller, in determining whether the operation condition of the vehicle has deviated from the normal operation condition, is further operative to determine one of the following conditions: the speed of the vehicle is accelerated by the servo motor, the vehicle is climbing uphill, and the speed error signal exceeds the predetermined threshold for a predetermined amount of time.

17. The system as recited in claim 10 wherein the parameters of the polynomial are defined by determining a stable vehicle speed at each of the predetermined speed intervals to obtain vehicle data, applying an interpolation to the data to obtain a smooth curve, and fitting the curve by polynomial curve fitting.

18. The system as recited in claim 17 wherein the interpolation is a cubic Spline interpolation.

* * * * *

UNITED STATES PATENT AND TRADEMARK OFFICE
CERTIFICATE OF CORRECTION

PATENT NO : 5,977,738
DATED : Nov. 2, 1999
INVENTOR(S): Xainzhong John Cui and Matti K. Vint It is certified that error appears in the above-identified patent and that said Letters Patent are hereby corrected as shown below:

In the first line of the title:
"METHOD AND SYSTEM FOR CONTOLLING THE" should be
--METHOD AND SYSTEM FOR CONTROLLING THE--.

The Inventor "Xainzhong John Cui" should be
--John Xianzhong Cui--.

Signed and Sealed this

Tenth Day of April, 2001

Attest:

NICHOLAS P. GODICI

*Attesting Officer*  *Acting Director of the United States Patent and Trademark Office*